United States Patent
LaRose, Jr. et al.

(10) Patent No.: US 8,495,864 B2
(45) Date of Patent: Jul. 30, 2013

(54) AFTER-TREATMENT HEATING WITH ENGINE COMBUSTION FEEDBACK

(75) Inventors: Thomas LaRose, Jr., Redford, MI (US); Michael V. Taylor, Wolverine Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 12/938,407

(22) Filed: Nov. 3, 2010

(65) Prior Publication Data

US 2012/0102923 A1    May 3, 2012

(51) Int. Cl.
*F01N 3/00* (2006.01)
(52) U.S. Cl.
USPC ............. 60/285; 60/274; 60/286; 123/676; 73/114.33
(58) Field of Classification Search
USPC ............ 60/274–324; 123/27 R, 299, 393, 123/435, 436, 676; 73/114.02, 114.18, 114.32–114.35; 701/103, 104, 111
See application file for complete search history.

(56) References Cited

U.S. PATENT DOCUMENTS

| | | | | |
|---|---|---|---|---|
| 5,642,705 A * | 7/1997 | Morikawa et al. | | 123/300 |
| 6,560,526 B1 * | 5/2003 | Matekunas et al. | | 701/104 |
| 7,104,043 B2 * | 9/2006 | Zhu et al. | | 60/284 |
| 7,134,423 B2 * | 11/2006 | Zhu et al. | | 123/406.14 |
| 7,210,456 B2 * | 5/2007 | Moriya et al. | | 123/435 |
| 7,234,446 B2 * | 6/2007 | Toyoda | | 123/406.14 |
| 7,337,657 B2 * | 3/2008 | Haussner et al. | | 73/114.18 |
| 7,533,524 B2 * | 5/2009 | Wang et al. | | 60/297 |
| 2007/0084442 A1 * | 4/2007 | Nakagawa et al. | | 123/406.27 |

* cited by examiner

*Primary Examiner* — Thomas Denion
*Assistant Examiner* — Jesse Bogue
(74) *Attorney, Agent, or Firm* — Quinn Law Group, PLLC

(57) ABSTRACT

A method of operating an engine having an after-treatment system that treats exhaust gas from the engine with an oxidation catalyst includes adjusting the operation of the engine to increase the temperature of the exhaust gas, continuously sensing a cylinder pressure with a pressure sensor disposed at at least one cylinder of the engine to identify a unstable combustion event, i.e., an engine misfire, and adjusting the operation of the engine to prevent a future unstable combustion event when the unstable combustion event is detected.

15 Claims, 1 Drawing Sheet

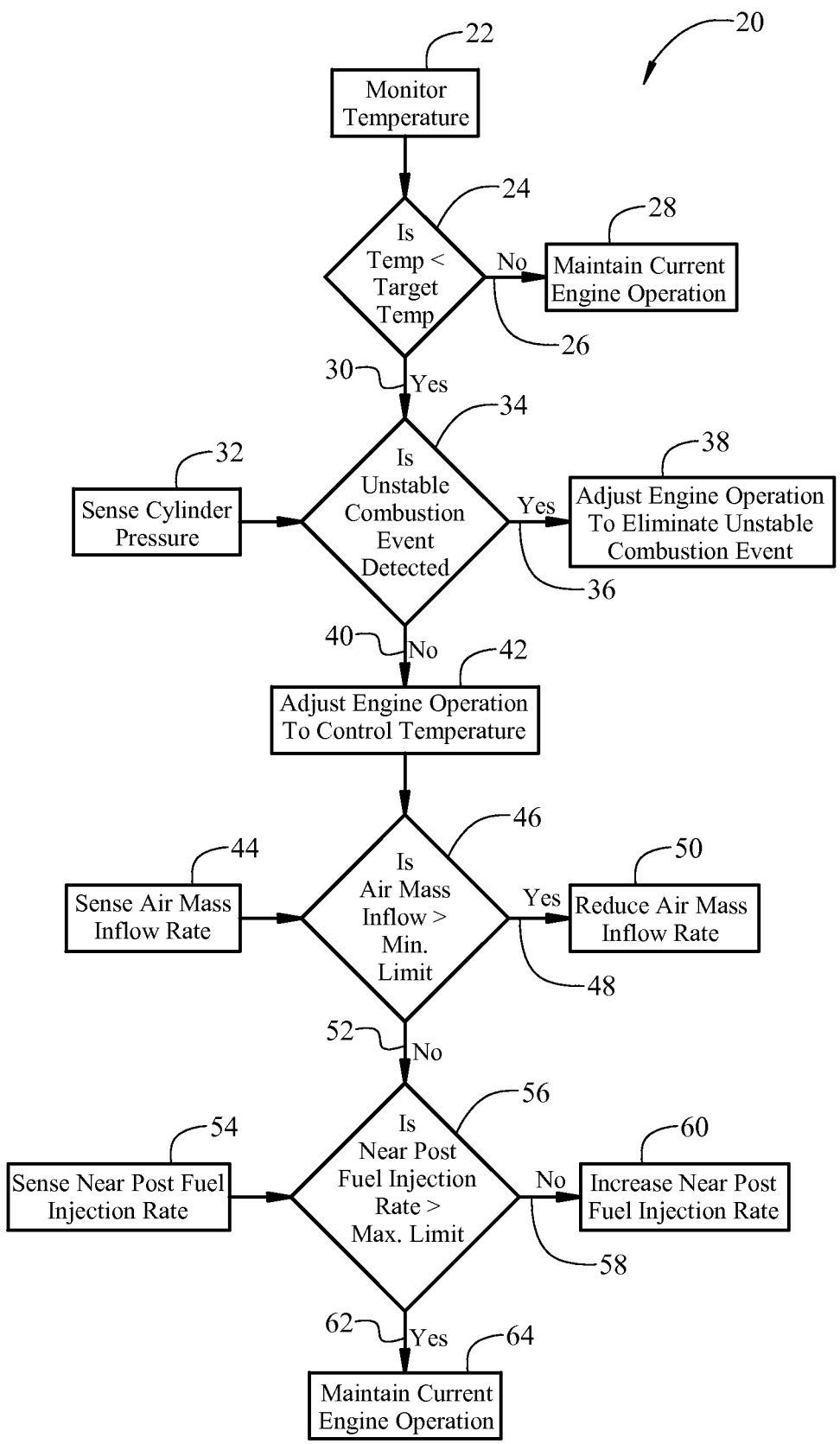

AFTER-TREATMENT HEATING WITH ENGINE COMBUSTION FEEDBACK

TECHNICAL FIELD

The invention relates to a method of operating an internal combustion engine having an after-treatment system that treats exhaust gas of the engine with an oxidation catalyst.

BACKGROUND

Internal combustion engines, and diesel engines particularly, often include an after-treatment system for treating exhaust gas from the engine. The after-treatment system uses an oxidation catalyst to heat the exhaust gas to a desired temperature to burn soot from the exhaust gas. The oxidation catalyst oxidizes unburned hydrocarbons in the exhaust gas to produce heat. The unburned hydrocarbons are injected into the exhaust gas through either a late in-cylinder injection process or an external post cylinder injection process.

In order for the oxidation catalyst to oxidize the unburned hydrocarbons, the oxidation catalyst must be heated to a light-off temperature of the oxidation catalyst. During low ambient air temperature conditions or at low exhaust flow conditions, heating the oxidation catalyst to the light-off temperature becomes difficult.

SUMMARY

A method of operating an internal combustion engine having an after-treatment system that treats exhaust gas with an oxidation catalyst is provided. The method includes continuously monitoring a temperature of the exhaust gas upstream of the oxidation catalyst. The method further includes adjusting operation of the engine to control the temperature of the exhaust gas upstream of the oxidation catalyst to achieve a minimum light-off temperature of the oxidation catalyst. The method further includes sensing a cylinder pressure within at least one cylinder of the engine to detect an unstable combustion event within the at least one cylinder, and adjusting the operation of the engine to prevent a future unstable combustion event when the unstable combustion event is detected.

In another aspect, a method of operating an internal combustion engine having an after-treatment system that treats exhaust gas with an oxidation catalyst is also provided. The method includes continuously monitoring a temperature of the exhaust gas upstream of the oxidation catalyst. The method further includes sensing an air mass inflow rate of combustion air flowing into the engine, and determining if the air mass inflow rate is within a pre-defined range. The method further includes adjusting operation of the engine to increase the temperature of the exhaust gas upstream of the oxidation catalyst to achieve a minimum light-off temperature of the oxidation catalyst. The method further includes continuously sensing a cylinder pressure within at least one cylinder of the engine with a pressure sensor disposed at the at least one cylinder to detect an unstable combustion event within the at least one cylinder, and adjusting the air mass inflow rate when the air mass inflow rate is within the pre-defined range to prevent a future unstable combustion event when the unstable combustion event is detected.

Accordingly, the method operates the engine in a condition that increases the temperature of the exhaust gas, while sensing the cylinder pressure of the engine to identify any unstable combustion events in the engine, i.e., engine misfires, and adjusts the operation of the engine when necessary to eliminate the unstable combustion events, i.e., prevent any future unstable combustion events. Because the method senses the cylinder pressure to identify unstable combustion events and adjusts the operation of the engine to prevent future unstable combustion events, the method may safely operate the engine in a condition that more quickly increases the temperature of the exhaust gas, even though this condition is more likely to produce a unstable combustion event.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flow chart showing a method of operating an internal combustion engine having an after-treatment system that treats exhaust gas with an oxidation catalyst.

DETAILED DESCRIPTION

Referring to FIG. 1, a method of operating an internal combustion engine is generally shown at 20. The engine may include, but is not limited to, a diesel engine. The engine includes an after-treatment system that treats exhaust gas with an oxidation catalyst. The exhaust gas from the engine heats the oxidation catalyst to a light-off temperature. The light-off temperature is the temperature at which the oxidation catalyst begins to oxidize unburned hydrocarbons. Once the oxidation catalyst reaches the light-off temperature, the oxidation catalyst oxidizes unburned hydrocarbons in the exhaust gas to produce heat to burn soot trapped in a particulate filter. Accordingly, the exhaust gas must be hot enough to heat the oxidation catalyst to the light-off temperature to begin the oxidation of the unburned hydrocarbons.

The engine may include a plurality of cylinders, with a pressure sensor disposed at at least one of the cylinders. While this specification describes a pressure sensor disposed at each cylinder of the engine, it should be appreciated that only one cylinder may include a pressure sensor, a portion of the cylinders may include a pressure cylinder or each cylinder may include a pressure sensor. Each pressure sensor measures or senses the pressure within a combustion chamber of the cylinder. The pressure sensor may include a glow plug pressure sensor. However, it should be appreciated that the pressure sensor may include some other type of sensor capable of sensing the pressure within the combustion chamber of the cylinder.

A computer, such as but not limited to an engine control unit, may control the operation of the engine. The engine control unit is in communication with the pressure sensors as well as other various sensors throughout the vehicle for receiving information related to the operation of the vehicle and/or the engine, and sends signals to various components of the vehicle and/or the engine to control the operation of the vehicle and/or the engine. The engine control unit includes all software, memory, hardware and any other components necessary for processing the information and controlling the operation of the engine. Accordingly, the disclosed method described below may be embodied as an algorithm stored in the engine control unit, and operable to control the operation of the engine.

The method includes continuously monitoring a temperature of the exhaust gas upstream of the oxidation catalyst, block 22. The temperature of the exhaust gas may be measured by a temperature sensor or the like. The information regarding the sensed temperature of the exhaust gas may be communicated to the engine control unit for use in analyzing and controlling the operation of the engine.

As described above, the exhaust gas must be hot enough to raise the temperature of the oxidation catalyst to the light-off temperature. At normal operating conditions of the engine under load, the exhaust gas is likely to reach a temperature that is sufficient to heat the oxidation catalyst to the light-off temperature, in which case no change in the operation of the engine is required. Therefore, the method includes determining if the temperature of the exhaust gas is less than a target temperature, block 24. The engine control unit may compare the sensed temperature of the exhaust gas to the target temperature to determine if the sensed temperature of the exhaust gas is less than, equal to or greater than the target temperature. The target temperature may include any temperature equal to or greater than the light-off temperature of the oxidation catalyst that is sufficient to heat the oxidation catalyst to the light-off temperature.

If the temperature of the exhaust gas is not less than the target temperature, indicated at 26, i.e. if the exhaust gas is equal to or greater than the target temperature, then the method includes maintaining the current operation of the engine, block 28, and the operation of the engine is not modified. If the temperature of the exhaust gas is equal to or greater than the target temperature, then the current operation of the engine is sufficient to heat the oxidation catalyst to the light-off temperature.

At low idle speeds, or when operating the engine at low ambient temperatures, the exhaust gas may not reach a temperature sufficient to heat the oxidation catalyst to the light-off temperature, in which case the operation of the engine may be altered to increase the temperature of the exhaust gas. Accordingly, if the temperature of the exhaust gas is equal to or less than the target temperature, indicated at 30, then the method further includes sensing a cylinder pressure within at least one cylinder of the engine, block 32. Sensing the cylinder pressure within at least one cylinder may further be defined as continuously sensing the cylinder pressure within the at least one cylinder with the pressure sensor disposed at the at least one cylinder, e.g., the glow plug pressure sensor. If the engine is equipped with multiple pressure sensors, for example a pressure sensor at each cylinder, then the method may include sensing a cylinder pressure at each cylinder. The information regarding the sensed cylinder pressure may be communicated to and/or stored in the engine control unit for use in analyzing and controlling the operation of the engine.

The method further includes identifying, i.e., detecting, an unstable combustion event within any of the cylinders, block 34. The unstable combustion event may be defined as, but is not limited to, an engine misfire event. Accordingly, the pressure sensor continuously senses the pressure within cylinder to detect a pressure spike, such as an engine misfire. The engine control unit may analyze the sensed cylinder pressure information to identify the pressure spike as the unstable combustion event.

In the event an unstable combustion event is detected by the pressure sensor, indicated at 36, then the method includes adjusting one or both of an air mass inflow rate and/or a near post fuel injection rate to eliminate the unstable combustion event and prevent any future unstable combustion events, block 38. For example, if the engine is operating too rich, the air mass inflow rate may be increased to increase the amount of air present in the combustion chamber of the cylinders until the unstable combustion event(s) cease. This level of the air mass inflow rate may be stored in the memory of the engine control unit as a minimum air mass inflow limit. In order to heat the exhaust gas, fuel may be added to the exhaust gas near the end of the combustion cycle, within the cylinder of the engine. This is commonly referred to as near post injection. The fuel then burns through the exhaust cycle prior to encountering the oxidation catalyst, thereby heating the exhaust gas. The near post fuel injection rate is the rate at which fuel is injected into the exhaust gas. The near post fuel injection rate may be reduced if too much fuel is being injected into the cylinder after combustion has occurred. This level of the near post fuel injection rate may be stored in the memory of the engine control unit as a maximum near post fuel injection limit.

If an unstable combustion event is not identified, indicated at 40, then the method may further include adjusting operation of the engine to control the temperature of the exhaust gas upstream of the oxidation catalyst to achieve the target temperature, e.g., the minimum light-off temperature of the oxidation catalyst, block 42. Adjusting the operation of the engine to control the temperature of the exhaust gas upstream of the oxidation catalyst may further be defined as adjusting the operation of the engine to increase the temperature of the exhaust gas upstream of the oxidation catalyst to achieve a light-off temperature of the oxidation catalyst.

Adjusting the operation of the engine to control the temperature of the exhaust gas may include sensing an air mass inflow rate of the combustion air flowing into the engine, block 44, and determining if the air mass inflow rate is within a pre-defined range and/or greater than a minimum air mass inflow limit, block 46. The air mass inflow rate is the quantity of air that flows into the engine over a given period of time. Each specific engine operates most efficiently for given environment conditions within a specific air mass inflow rate range, and includes the minimum air mass inflow limit, which the engine must operate above to avoid unstable combustion events. The engine operates inefficiently, or may fail to operate, when the air mass inflow rate is outside of the pre-defined range, and particularly below the minimum air mass inflow limit.

Adjusting the operation of the engine to increase the temperature of the exhaust gas upstream of the oxidation catalyst may include adjusting at least one of the air mass inflow rate of the engine or the near post fuel injection rate of the after-treatment system. If the air mass inflow rate is greater than the minimum air mass inflow limit and within the predefined range, indicated at 48, then adjusting the operation of the engine to increase the temperature of the exhaust gas includes reducing the air mass inflow rate, block 50. By reducing the air mass inflow rate, less air is heated during the combustion cycle of the engine, thereby increasing the temperature of the exhaust gas. However, it should be appreciated that the air mass inflow rate should be maintained above the minimum air mass inflow limit and within the pre-defined range of the air mass inflow rate to maintain proper operation of the engine.

If the air mass flow rate is at equal to or less than the minimum air mass inflow limit, indicated at 52, then the method may further include sensing a near post fuel injection rate of the after-treatment system, block 54, and determining if the near post fuel injection rate is greater than the maximum near post fuel injection limit and within a pre-defined range of the near post fuel injection rate, block 56. The near post fuel injection rate may operate within the pre-defined range and/or below the maximum near post fuel injection limit to maximize heating of the exhaust gas, without injecting excess fuel into the exhaust gas that may fail to burn prior to the oxidation catalyst.

If the near post fuel injection rate is within the pre-defined range and less than the maximum near post fuel injection limit, indicated at 58, then adjusting the operation of the engine to increase the temperature of the exhaust gas may include increasing the near post fuel injection rate, block 60. By increasing the near post fuel injection rate into the exhaust gas, more fuel exists within the exhaust gas to burn, thereby increasing the temperature of the exhaust gas. However, it should be appreciated that the near post fuel injection rate should be maintained within the pre-defined range of the near post fuel injection rate and below the maximum near post fuel injection rate to prevent excess fuel from being injected into the exhaust gas. Accordingly, adjusting the operation of the engine to increase the temperature of the exhaust gas may include increasing the air mass inflow rate and/or increasing the near post fuel injection rate.

If the near post fuel injection rate is not within the pre-defined range and/or is greater than the maximum near post fuel injection limit, indicated at 62, then the method includes maintaining the current operation of the engine, block 64, and the operation of the engine is not modified.

In maximizing the heating potential of the engine, the engine is continuously operated on the verge of producing an unstable combustion event. Accordingly, by continuously sensing the pressure within the cylinders with the pressure sensors, the operation of the engine may be altered when necessary to prevent future unstable combustion events when detected and identified. This allows for quickly heating the exhaust gas, which brings the oxidation catalyst up to the light-off temperature as quickly as possible.

While the best modes for carrying out the invention have been described in detail, those familiar with the art to which this invention relates will recognize various alternative designs and embodiments for practicing the invention within the scope of the appended claims.

The invention claimed is:

1. A method of operating an internal combustion engine having an after-treatment system that treats exhaust gas with an oxidation catalyst, the method comprising:
   continuously monitoring a temperature of the exhaust gas upstream of the oxidation catalyst;
   sensing an air mass inflow rate of combustion air flowing into the engine;
   determining if the air mass inflow rate is within a pre-defined range;
   adjusting operation of the engine to increase the temperature of the exhaust gas upstream of the oxidation catalyst to achieve a target temperature, wherein adjusting the operation of the engine to increase the temperature of the exhaust gas upstream of the oxidation catalyst includes adjusting at least one of the air mass inflow rate of the engine or a near post fuel injection rate of the after-treatment system, and maintaining current operation of the engine when the temperature of the exhaust gas is equal to or greater than the target temperature;
   sensing a cylinder pressure within at least one cylinder of the engine to detect the occurrence of an unstable combustion event within the at least one cylinder; and
   adjusting the operation of the engine to prevent a future unstable combustion event when the unstable combustion event is detected.

2. A method as set forth in claim 1 wherein sensing a cylinder pressure within the at least one cylinder of the engine is further defined as continuously sensing a cylinder pressure within the at least one cylinder of the engine.

3. A method as set forth in claim 2 wherein the engine includes a pressure sensor disposed at the at least one cylinder and sensing a cylinder pressure within the at least one cylinder is further defined as sensing the cylinder pressure within the at least one cylinder with the pressure sensor disposed at the at least one cylinder.

4. A method as set forth in claim 3 wherein the pressure sensor includes a glow plug pressure sensor.

5. A method as set forth in claim 1 wherein adjusting the operation of the engine to increase the temperature of the exhaust gas includes reducing the air mass inflow rate when the air mass inflow rate is within the pre-defined range.

6. A method as set forth in claim 1 wherein adjusting the operation of the engine to prevent a future unstable combustion event includes increasing the air mass inflow rate of the engine.

7. A method as set forth in claim 6 wherein adjusting the operation of the engine to prevent a future unstable combustion event is further defined as increasing the air mass inflow rate when the air mass inflow rate is within the pre-defined range.

8. A method as set forth in claim 1 further comprising sensing a near post fuel injection rate of the after-treatment system.

9. A method as set forth in claim 8 further comprising determining if the near post fuel injection rate is within a pre-defined range.

10. A method as set forth in claim 9 wherein adjusting the operation of the engine to increase the temperature of the exhaust gas includes increasing the near post fuel injection rate when the near post fuel injection rate is within the pre-defined range.

11. A method as set forth in claim 1 wherein the target temperature is equal to or greater than a light-off temperature of the oxidation catalyst and wherein adjusting the operation of the engine to control the temperature of the exhaust gas upstream of the oxidation catalyst is further defined as adjusting the operation of the engine to control the temperature of the exhaust gas upstream of the oxidation catalyst to achieve a temperature equal to or greater than the light-off temperature of the oxidation catalyst.

12. A method as set forth in claim 1 wherein a unstable combustion event includes an engine misfire event.

13. A method of operating an internal combustion engine having an after-treatment system that treats exhaust gas with an oxidation catalyst, the method comprising:
   continuously monitoring a temperature of the exhaust gas upstream of the oxidation catalyst;
   sensing an air mass inflow rate of combustion air flowing into the engine;
   determining if the air mass inflow rate is within a pre-defined range;
   adjusting operation of the engine to increase the temperature of the exhaust gas upstream of the oxidation catalyst to achieve a target temperature;
   continuously sensing a cylinder pressure within at least one cylinder of the engine with a pressure sensor disposed at the at least one cylinder to detect the occurrence of an unstable combustion event within the at least one cylinder; and
   adjusting the air mass inflow rate when the air mass inflow rate is within the pre-defined range to prevent a future unstable combustion event when the unstable combustion event is detected.

14. A method as set forth in claim 13 wherein adjusting the operation of the engine to increase the temperature of the exhaust gas upstream of the oxidation catalyst includes adjusting at least one of an air mass inflow rate of the engine and a near post fuel injection rate of the after-treatment system.

15. A method as set forth in claim 14 wherein adjusting the operation of the engine to increase the temperature of the exhaust gas is further defined as adjusting at least one of the air mass inflow rate when the air mass inflow rate is within the pre-defined range and the near post fuel injection rate when the near post fuel injection rate is within a pre-defined range of the near post fuel injection rate.

\* \* \* \* \*